United States Patent
Ananthanarayanan et al.

(10) Patent No.: US 6,689,981 B1
(45) Date of Patent: Feb. 10, 2004

(54) METHOD FOR METALLURGICALLY CAPPING AN END OF A TUBE

(75) Inventors: Venkatasubramanian Ananthanarayanan, Beavercreek, OH (US); Dharmendra M. Ramachandra, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/238,061

(22) Filed: Sep. 9, 2002

(51) Int. Cl.[7] .............................................. B23K 11/00
(52) U.S. Cl. .................................... 219/59.1; 219/78.16
(58) Field of Search .......................... 219/59.1, 61.11, 219/78.01, 78.16, 101, 102, 104, 117.1; 285/189, 288.1, 382

(56) References Cited

U.S. PATENT DOCUMENTS 2,326,296 A * 8/1943 Harrison et al. .............. 53/510
4,273,983 A * 6/1981 Ogawa et al. ................ 219/93
4,676,427 A * 6/1987 Constance ................... 228/189

* cited by examiner

Primary Examiner—M. Alexandra Elve
Assistant Examiner—Kevin P. Kerns
(74) Attorney, Agent, or Firm—Scott A. McBain

(57) ABSTRACT

A method for metallurgically capping an end of a tube. A tube is obtained having a tube end portion and having a passageway which extends to the tube end portion A cap is obtained and positioned on the tube end portion covering the passageway. The tube end portion of the tube is folded around the cap creating an end portion fold while leaving a space within the fold. A resistance welding current path is created through the tube and the cap proximate the fold and the fold is moved deformingly against the cap creating a weld zone which includes at least some of the fold and at least some of the cap.

19 Claims, 4 Drawing Sheets

METHOD FOR METALLURGICALLY CAPPING AN END OF A TUBE

TECHNICAL FIELD

The present invention relates generally to metallurgy, and more particularly to a method for metallurgically capping an end of a tube.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for attaching parts together include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate (such as an end cap plate), the tube is rotated about its longitudinal axis, and the tube end and the plate are pressed together, wherein friction causes heating creating the weld. Friction welding requires expensive welding equipment, and the process requires a long cycle time between welds.

What is needed is a less expensive method for metallurgically capping an end of a tube.

SUMMARY OF THE INVENTION

A first method of the invention is for metallurgically capping an end of a tube and includes steps a) through e). Step a) includes obtaining a tube having a tube end portion and having a passageway which extends to the tube end portion. Step b) includes obtaining a cap. Step c) includes, after steps a) and b), positioning the cap on the tube end portion covering the passageway. Step d) includes, after step c), folding the tube end portion of the tube around the cap creating an end portion fold while leaving a space within the fold. Step e) includes, after step d), creating a resistance welding current path through the tube and the cap proximate the fold and moving the fold deformingly against the cap creating a weld zone which includes at least some of the fold and at least some of the cap.

Several benefits and advantages are derived from one or more of the methods of the invention. Resistance welding is less expensive than gas metal arc welding or friction welding. Resistance welding also has a shorter cycle time between welds than gas metal arc welding or friction welding.

DESCRIPTION OF THE PREFERRED EMBODIMENTS

Figure 1:
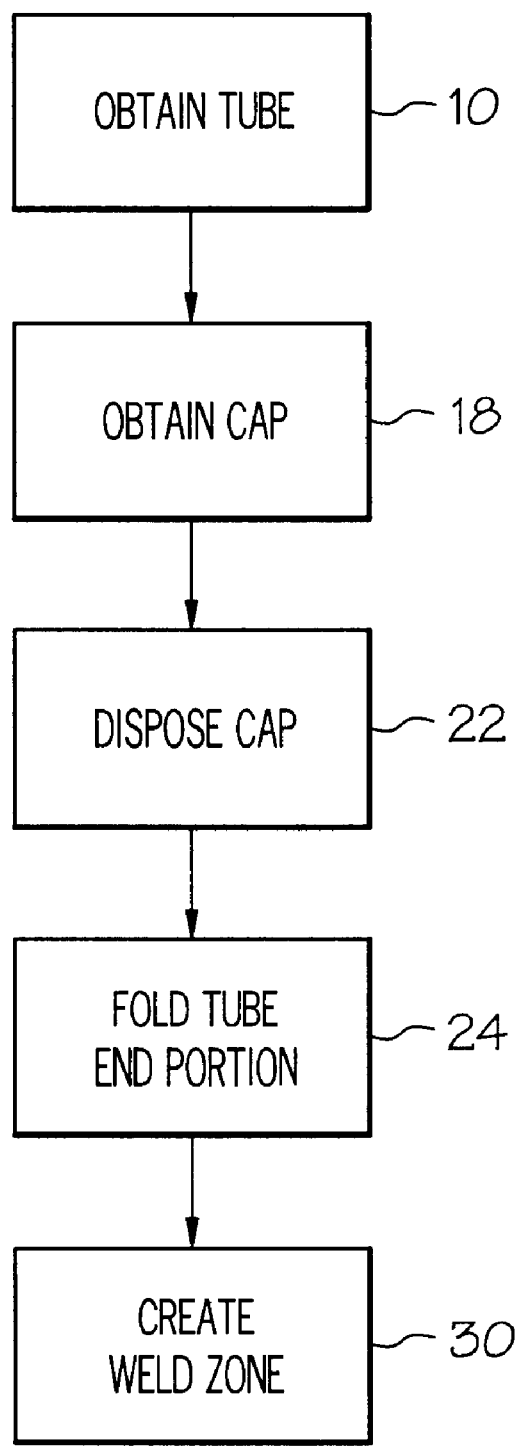
FIG. 1 is a block diagram of the first method of the invention for metallurgically capping an end of a tube.
Figure 2:
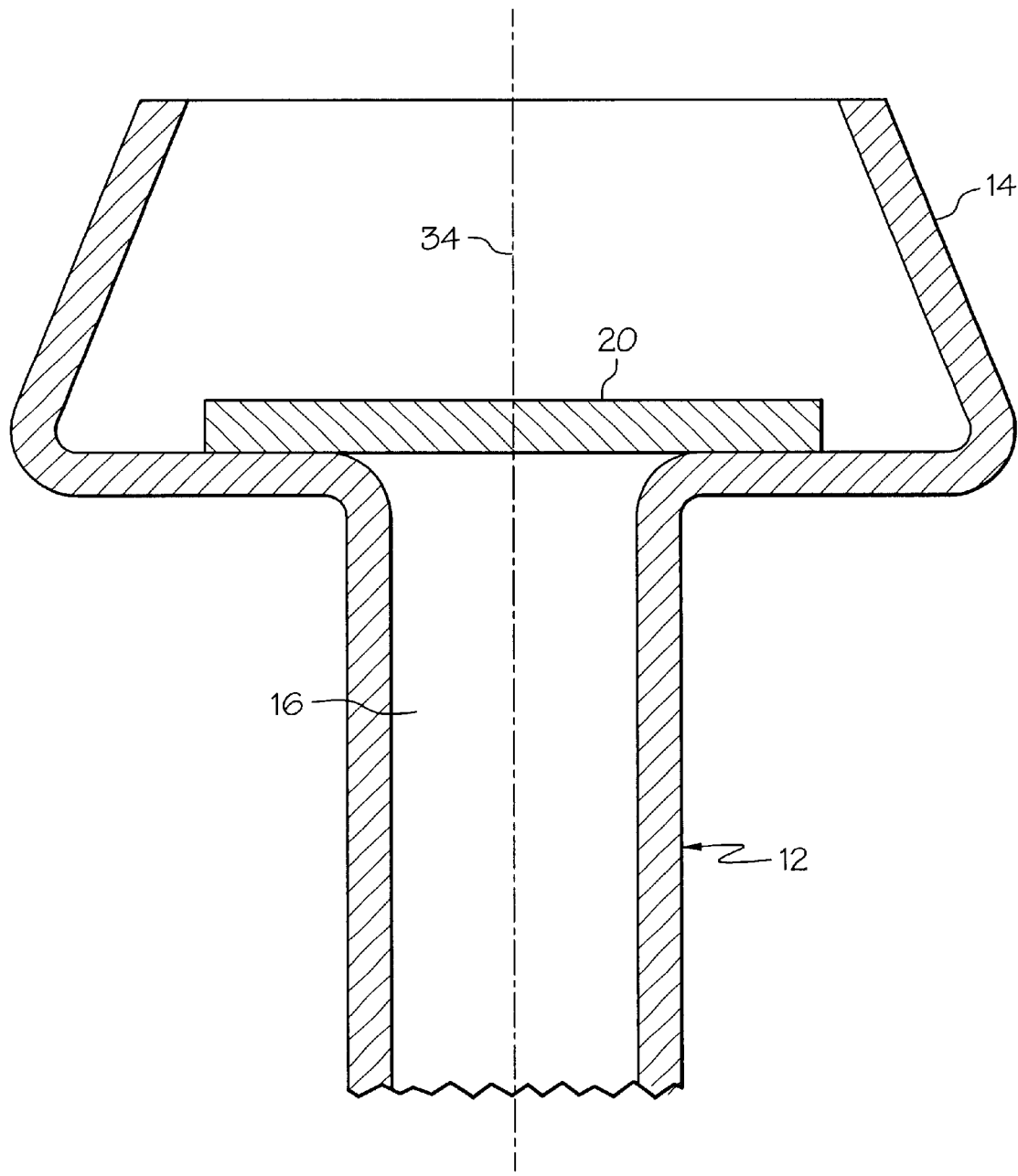
FIG. 2 is a schematic, side cross-sectional view of a first embodiment of a tube and a cap used in a first example of the first method of FIG. 1, showing the cap disposed on a tube end portion.
Figure 3:
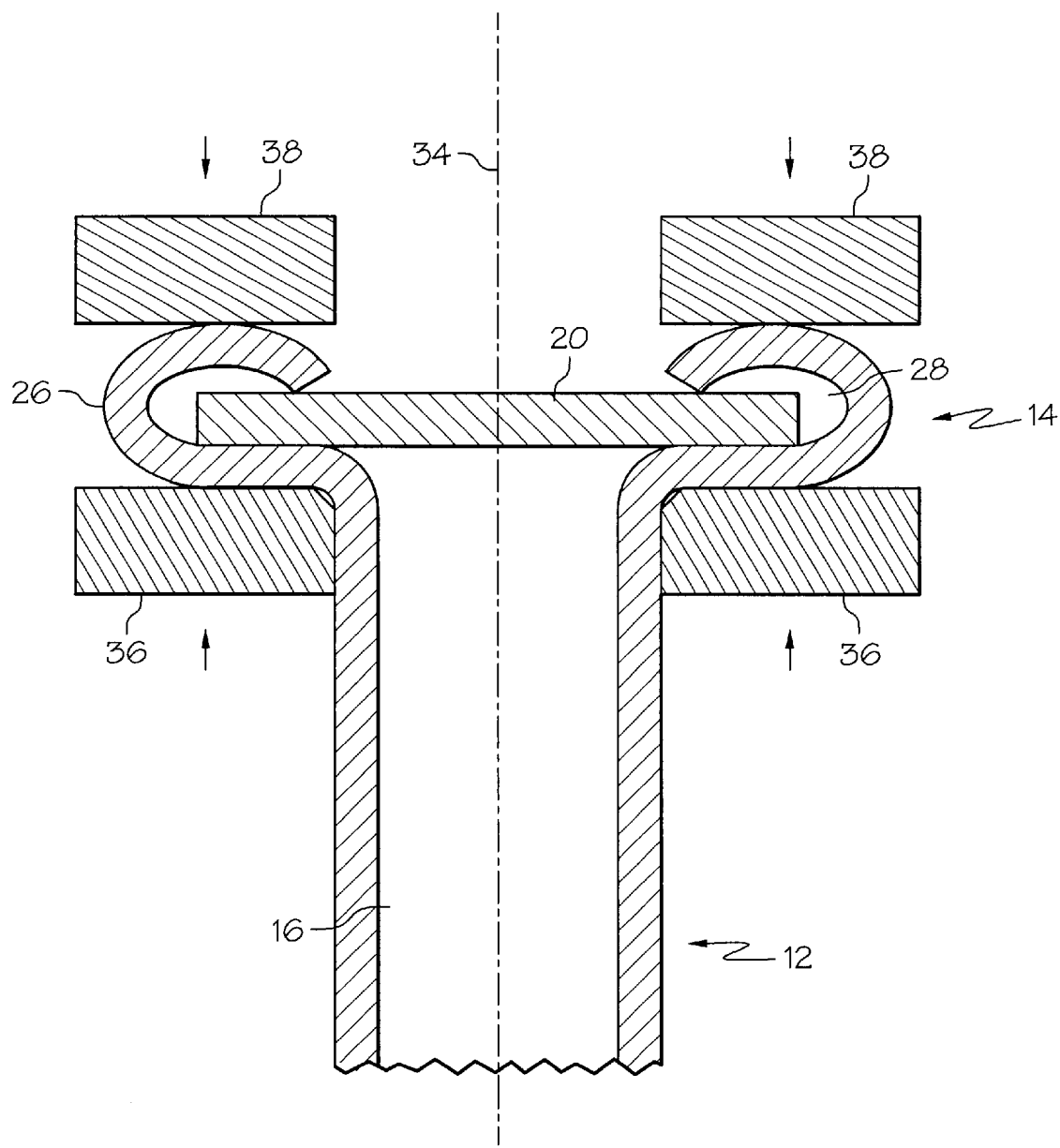
FIG. 3 is a view, as in FIG. 2, but showing the tube end portion folded around the cap and showing the placement of a first embodiment of first and second resistance-welding electrodes used in the first example of the first method.
Figure 4:
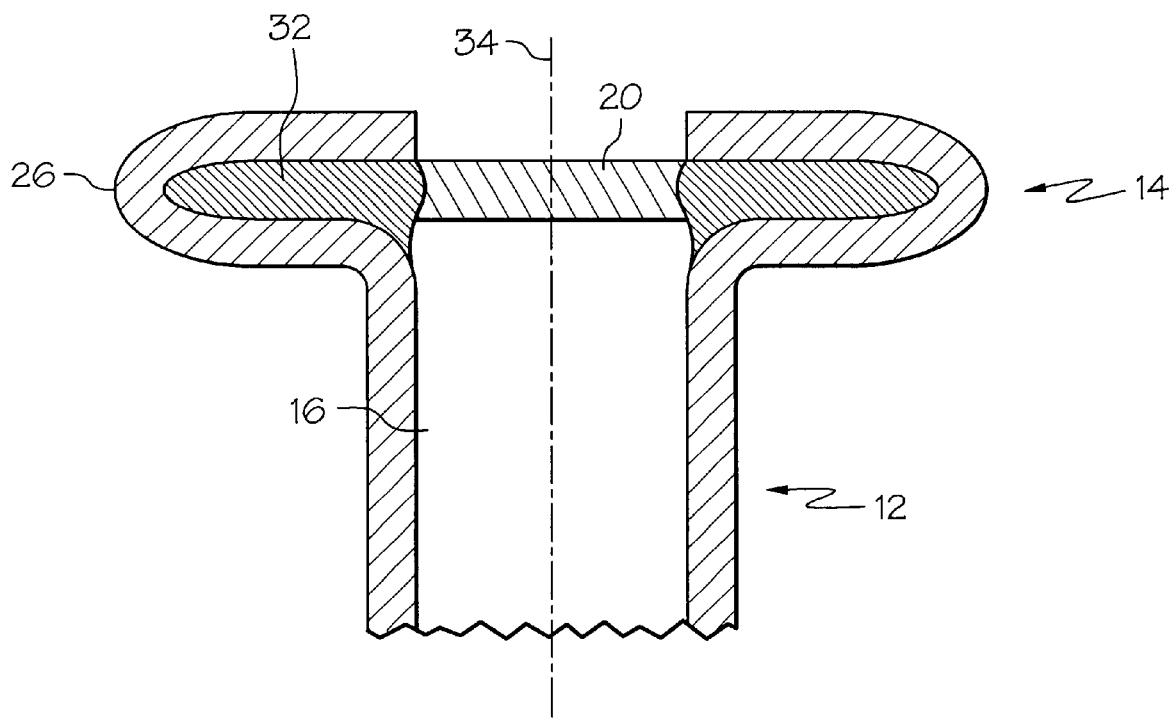
FIG. 4 is a view, as in FIG. 3, but showing the metallurgically capped tube with the welding electrodes removed.

A first method of the invention is for metallurgically capping an end of a tube and is shown in block diagram form in FIG. 1. A first embodiment of a tube, a cap, and welding electrodes used in one example of the first method are shown in FIGS. 2–4. The first method includes steps a) through e). Step a) is labeled as "Obtain Tube" in block 10 of FIG. 1. Step a) includes obtaining a tube 12 having a tube end portion 14 and having a passageway 16 which extends to the tube end portion 14. Step b) is labeled as "Obtain Cap" in block 18 of FIG. 1. Step b) includes obtaining a cap 20. Step c) is labeled as "Dispose Cap" in block 22 of FIG. 1. Referring to FIG. 2, step c) includes, after steps a) and b), disposing the cap 20 on the tube end portion 14 covering the passageway 16. Step d) is labeled as "Fold Tube End Portion" in block 24 of FIG. 1. Step d) includes, after step c), folding the tube end portion 14 of the tube 12 around the cap 20 creating an end portion fold 26 while leaving a space 28 within the fold 26. A "fold" of a tube end portion is a fold of the tube wall of a tube end portion. FIG. 3 depicts an example of the first method after step d) and before step e). Step e) is labeled as "Create Weld Zone" in block 30 of FIG. 1. Step e) includes, after step d), creating a resistance welding current path through the tube 12 and the cap 20 proximate the fold 26 and moving the fold 26 deformingly against the cap 20 creating a weld zone 32 (an example of which is shown in FIG. 4) which includes at least some of the fold 26 and at least some of the cap 20. The term "proximate" includes, without limitation, the term "at".

In one application of the first method, such movement squeezes out surface contaminants from between the fold and the cap and such movement levels the hills and valleys between the contacting surfaces of the fold and the cap to bring surface atoms of the fold within atomic bonding distances with surface atoms of the cap. In one implementation of the first method, step e) does not melt any of the fold and does not melt any of the cap. In one variation, step e) does not melt any of the tube end portion 14 and does not melt any of the cap 20. In another implementation, step e) melts at least some of the fold or at least some of the cap or melts at least some of the fold and at least some of the cap.

The shape of the tube end portion 14 of the tube obtained in step a) is arbitrary as long as it permits the cap 20 to be placed on the tube end portion 14 so as to cover the passageway 16 while leaving some of the tube end portion 14 uncovered by the cap 20 for later folding around the cap 20. Tube end portion shapes include, without limitation, a tube end portion having an outside diameter which is constant (or not) along the longitudinal length of the tube end portion and equal to (or less than or greater than) the outside diameter of the adjoining portion of the tube but having an inside diameter which is greater than the inside diameter of the adjoining portion of the tube. The inside diameter of the tube end portion may be constant along the longitudinal length of the tube end portion or may be varying with its minimum inside diameter being greater than the inside diameter of the adjoining portion of the tube. Particular tube end portion shapes also include, without limitation, outwardly-flared tube end portions such as a radially-extending flange shape, a radially-extending flange shape with a longitudinally-extending flange end, the shape of the tube end portion 14 shown in FIG. 2, and a funnel shape. Particular tube end portion shapes further include, without limitation, a tube end portion having a larger inside diameter which is a step change from the smaller inside diameter of the adjoining portion of the tube and having an outside diameter equal to the outside diameter of the adjoining portion of the tube. Still other tube end portion shapes are left to the artisan.

In one modified first method, there is included the step of creating an outwardly-flared tube end portion in the tube obtained in step a) of the original first method when the tube obtained in step a) of the original first method does not have an outwardly-flared tube end portion. Methods for creating outwardly-flared end portions of tubes are known to those skilled in the art and include, without limitation, use of mandrels and use of hydroforming techniques.

In one example of the first method, the fold 26 is an annular fold substantially coaxially aligned with the longitudinal axis 34 of the tube 12, and step e) creates an annular weld zone 32. In one variation, step e) hermetically seals the tube end portion 14. Other fold shapes and weld-zone shapes are left to the artisan.

In one choice of tubes, the tube 12 is a substantially right-circular cylindrical tube, and the cap 20 is a substantially-circular disk. In another choice, the tube 12 is a substantially right-rectangular cylindrical tube, and the cap 20 is a substantially-rectangular plate. Other tube and cap shapes are left to the artisan.

In one application of the first method, step e) uses a resistance-welding first electrode 36 contacting the outside of the tube 12 proximate the fold 26 below the cap 20, uses a resistance-welding second electrode 38 contacting the outside of the fold 26 above the cap 20, and relatively moves the first and second electrodes 36 and 38 to move the fold 26 deformingly against the cap 20. By "relatively moves" is meant moving the first electrode with the second electrode stationary or moving the second electrode with the first electrode stationary or moving both the first and second electrodes, as is within the level of skill of the artisan. Unnumbered arrows in FIG. 3 indicate the direction of relative longitudinal movement of the electrodes during step e).

In one variation, the first electrode 36 is an annular electrode and the second electrode 38 is an annular electrode. The particular annular electrode shape and other non-annular electrode shapes are left to the artisan. In one modification, not shown, the first electrode longitudinally contacts the second electrode at the completion of step e). This ensures that no overheating of the weld zone will occur, as can be appreciated by those skilled in the art.

In the same or a different application of the first method, step d) uses a resistance-welding first electrode 36 contacting the outside of the tube end portion 14 below the cap 20, uses a resistance-welding second electrode 38 contacting the outside of the tube end portion 14 above the cap 20, and relatively moves the first and second electrodes 36 and 38. In one variation, step d) creates an electric current path through the tube 12 between the first and second electrodes 36 and 38 at a lower electric current than the electric current of the resistance welding current path of step e). Other apparatus and techniques for creating the fold 26 are left to the artisan.

In one construction for an example of the first method, the tube 12 and the cap 20 comprise low carbon steel, such as AISI 1008 to 1010 with the tube 12 having an outside diameter (apart from the outwardly-flared tube end portion 14) of generally 6 millimeters and a wall thickness of generally 2 millimeters, and with the cap 20 having a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes for step e). The first method is not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

In one design for the first method, the previously-discussed electrodes are installed in "T"-shaped electrode holders of a resistance welding machine (not shown). In one example, not shown, the first electrode is formed from two sections which are brought together around the tube and engage the tube. The electrode sections have surfaces generally corresponding to the shape of the engaged portion of the tube. The electrode sections are attached together before installing the first electrode in the corresponding lower one of the "T"-shaped electrode holders of the resistance welding machine. Likewise, in the same or another example, the second electrode is formed from two sections which are brought together on top of the fold and engage the fold.

A second method of the invention is for metallurgically capping an end of a tube and includes steps a) through e). Step a) includes obtaining a tube having a longitudinal axis, having a tube end portion which is outwardly-flared, and having a passageway which extends to the tube end portion. Step b) includes obtaining a substantially-planar cap. Step c) includes, after steps a) and b), disposing the cap on the tube end portion covering the passageway. Step d) includes, after step c), folding the tube end portion of the tube around the cap creating an annular end portion fold having longitudinally-spaced-apart first and second fold portions trapping the cap therebetween while leaving a longitudinally-extending space 28 within the fold. Step e) includes, after step d), creating a resistance welding current path through the tube and the cap proximate the fold and longitudinally moving the fold deformingly against the cap creating an annular weld zone which includes at least some of the fold and at least some of the cap. It is noted that any of the examples, applications, etc. of the first method are equally applicable to the second method.

Several benefits and advantages are derived from one or more of the methods of the invention. Resistance welding is less expensive than gas metal arc welding or friction welding. Resistance welding also has a shorter cycle time between welds than does gas metal arc welding or friction welding.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for metallurgically capping an end of a tube comprising the steps of:
   a) obtaining a tube having a tube end portion and having a passageway which extends to the tube end portion;
   b) obtaining a cap;
   c) after steps a) and b), disposing the cap on the tube end portion covering the passageway;
   d) after step c), folding the tube end portion of the tube around the cap creating an end portion fold while leaving a space within the fold;
   e) after step d), creating a resistance welding current path through the tube and the cap proximate the fold and moving the fold deformingly against the cap creating a weld zone which includes at least some of the fold and at least some of the cap.

2. The method of claim 1, wherein the fold is an annular fold substantially coaxially aligned with the longitudinal axis of the tube, and wherein step e) creates an annular weld zone.

3. The method of claim 2, wherein step e) hermetically seals the tube end portion.

4. The method of claim 1, wherein the tube is a substantially right-circular cylindrical tube, and wherein the cap is a substantially-circular disk.

5. The method of claim 1, wherein the tube is a substantially right-rectangular cylindrical tube, and wherein the cap is a substantially-rectangular plate.

6. The method of claim 1, wherein step e) uses a resistance-welding first electrode contacting the outside of the tube proximate the fold below the cap, uses a resistance-welding second electrode contacting the outside of the fold above the cap, and relatively moves the first and second electrodes to move the fold deformingly against the cap.

7. The method of claim 6, wherein the first electrode is an annular electrode and the second electrode is an annular electrode.

8. The method of claim 1, wherein step d) uses a resistance-welding first electrode contacting the outside of the tube end portion below the cap, uses a resistance-welding second electrode contacting the outside of the tube end portion above the cap, and relatively moves the first and second electrodes.

9. The method of claim 8, wherein step d) creates an electric current path through the tube between the first and second electrodes at a lower electric current than the electric current of the resistance welding current path of step e).

10. The method of claim 1, wherein step e) does not melt any of the tube end portion and does not melt any of the cap.

11. A method for metallurgically capping an end of a tube comprising the steps of:
    a) obtaining a tube having a longitudinal axis, having a tube end portion which is outwardly-flared, and having a passageway which extends to the tube end portion;
    b) obtaining a substantially-planar cap;
    c) after steps a) and b), disposing the cap on the tube end portion covering the passageway;
    d) after step c), folding the tube end portion of the tube around the cap creating an annular end portion fold having longitudinally-spaced-apart first and second fold portions trapping the cap therebetween while leaving a longitudinally-extending space within the fold;
    e) after step d), creating a resistance welding current path through the tube and the cap proximate the fold and longitudinally moving the fold deformingly against the cap creating an annular weld zone which includes at least some of the fold and at least some of the cap.

12. The method of claim 11, wherein step e) hermetically seals the tube end portion.

13. The method of claim 11, wherein the tube is a substantially right-circular cylindrical tube, and wherein the cap is a substantially-circular disk.

14. The method of claim 11, wherein the tube is a substantially right-rectangular cylindrical tube, and wherein the cap is a substantially-rectangular plate.

15. The method of claim 11, wherein step e) uses a resistance-welding first electrode contacting the outside of the tube proximate the fold below the cap, uses a resistance-welding second electrode contacting the outside of the fold above the cap, and relatively moves the first and second electrodes to move the fold deformingly against the cap.

16. The method of claim 15, wherein the first electrode is an annular electrode and the second electrode is an annular electrode.

17. The method of claim 11, wherein step d) uses a resistance-welding first electrode contacting the outside of the tube end portion below the cap, uses a resistance-welding second electrode contacting the outside of the tube end portion above the cap, and relatively moves the first and second electrodes.

18. The method of claim 17, wherein step d) creates an electric current path through the tube between the first and second electrodes at a lower electric current than the electric current of the resistance welding current path of step e).

19. The method of claim 11, wherein step e) does not melt any of the tube end portion and does not melt any of the cap.

* * * * *